(12) United States Patent
Okezie

(10) Patent No.: US 7,880,601 B2
(45) Date of Patent: Feb. 1, 2011

(54) VEHICLE SAFETY APPARATUS AND METHOD

(76) Inventor: Pathfins C. Okezie, 141 Middlesex Ave., Piscataway, NJ (US) 08854

( * ) Notice: Subject to any disclaimer, the term of this patent is extended or adjusted under 35 U.S.C. 154(b) by 361 days.

(21) Appl. No.: 12/125,987

(22) Filed: May 23, 2008

(65) Prior Publication Data

US 2009/0289443 A1    Nov. 26, 2009

(51) Int. Cl.
*B60Q 1/00*    (2006.01)
(52) U.S. Cl. .................. 340/457.1; 340/573.1; 340/3.1; 340/5.8; 340/5.81
(58) Field of Classification Search ............. 340/457.1, 340/572.1, 573.1, 3.1, 5.8, 5.6, 5.65, 5.81; 705/75; 235/380, 493
See application file for complete search history.

(56) References Cited

U.S. PATENT DOCUMENTS

| | | | | |
|---|---|---|---|---|
| 6,219,439 B1* | 4/2001 | Burger | ....................... | 382/115 |
| 6,224,109 B1* | 5/2001 | Yang | .......................... | 283/77 |
| 6,437,690 B1 | 8/2002 | Okezie | ....................... | 340/505 |
| 6,617,707 B1* | 9/2003 | Reece | ....................... | 307/10.5 |
| 6,679,425 B1* | 1/2004 | Sheppard et al. | ........... | 235/382 |
| 6,857,210 B2* | 2/2005 | Santa Cruz | ............. | 40/124.06 |
| 6,923,370 B2* | 8/2005 | Gotfried et al. | ............. | 235/382 |
| 7,013,365 B2* | 3/2006 | Arnouse | ..................... | 711/115 |
| 2002/0095587 A1* | 7/2002 | Doyle et al. | ................ | 713/186 |
| 2003/0200227 A1* | 10/2003 | Ressler | .................... | 707/104.1 |
| 2005/0137987 A1* | 6/2005 | May et al. | ..................... | 705/75 |

* cited by examiner

*Primary Examiner*—Toan N Pham
(74) *Attorney, Agent, or Firm*—Walter J. Tencza, Jr.

(57) ABSTRACT

An apparatus for a vehicle is provided comprising a first seat occupant detector, a first seat belt buckled sensor, and a seat belt warning device. The seat belt warning device may be configured to communicate with the first seat occupant detector and the first seat belt buckled sensor. The seat belt warning device may be programmed to cause an audible warning when the first seat occupant detector detects the presence of an individual in a first seat of the vehicle and the first seat belt buckled sensor detects that a first seat belt corresponding to the first seat is not buckled. The apparatus may include a first seat belt contacting seat sensor, wherein the first seat belt contacting seat sensor may determine if the first seat belt is in contact with the first seat.

14 Claims, 7 Drawing Sheets

VEHICLE SAFETY APPARATUS AND METHOD

FIELD OF THE INVENTION

This invention relates to improved methods and apparatus for safety devices for vehicles, such as automobiles.

BACKGROUND OF THE INVENTION

There are various devices known in the prior art for related to the automobile U.S. Pat. No. 6,437,690 B1, issued on to Okezie provides and uninsured and/or stolen vehicle tracking system.

Current seat belt technology in modern cars/vehicles only beeps to warn the vehicle operator and his/her passengers they are not wearing their car seat belt (s). The vehicle operator/passenger may choose to ignore such "beeper" warning. The beeping sounds made by the current car seat technology to warn vehicle operator/s or their passengers to put on their car seat belts does not go far enough.

Thousands of motorists/passengers have died in motor vehicle accident because they failed to buckle the vehicle seat belts even though it is the law of the land that you must buckle up whenever you ride in a vehicle. Millions in property damages have been incurred because people do not buckle up. The main reason why some motorists and passengers of a vehicle do not buckle up when they are in a moving vehicle is because they know that the law enforcement do not have the necessary technology to track/monitor motorists/passengers that do not buckle up. Law enforcement agencies rely on luck to track those motorists/passengers that do not buckle up.

An additional problem with motor vehicles is the high incidence of traffic fatalities and damage to properties among young drivers, such as those aged twenty one and younger. These younger drivers tend to speed more and drive more recklessly and as a result are more prone to get involved in more accidents.

SUMMARY OF THE INVENTION

One or more embodiments of the present invention provide improvements to the prior art, such as the prior art in Okezie U.S. Pat. No. 6,437,690 B1.

The present invention in one or more embodiments provides a car seat belt tracking device. The car seat belt tracking device automatically warns the passenger/s or occupants of a vehicle, such as an automobile, to buckle their vehicle seat belt/s and the consequences if they choose to ignore the warning. Alternatively, or additionally, the car seat belt tracking device may notify law enforcement authorities that someone is not wearing or did not buckle their seat belt or car seat, after the vehicle is in motion or after the vehicle is running.

In one embodiment of the present invention, drivers aged twenty-one and younger are constantly monitored by police patrol officers whenever they are operating a vehicle. In one embodiment, the physical driver's licenses of these younger drivers include a computer processor that causes information concerning the younger driver to be transmitted, so that it can be received by a computer processor in a police car, when the police car is within a certain range of the younger driver's driver's license.

In at least one embodiment of the present invention, an apparatus for a vehicle is provided comprising a first seat occupant detector, a first seat belt buckled sensor, and a seat belt warning device. The seat belt warning device may be configured to communicate with the first seat occupant detector and the first seat belt buckled sensor. The seat belt warning device may be programmed to cause an audible warning when the first seat occupant detector detects the presence of an individual in a first seat of the vehicle and the first seat belt buckled sensor detects that a first seat belt corresponding to the first seat is not buckled. The apparatus may include a first seat belt contacting seat sensor, wherein the first seat belt contacting seat sensor may determine if the first seat belt is in contact with the first seat. The seat belt warning device may be programmed to cause an audible warning when the first seat belt buckled sensor indicates that the first seat belt is buckled and the first seat belt contacting seat sensor is in contact with the first seat, indicating that the first seat belt is not properly securing the individual. The apparatus may include any further number of seat occupant detectors and seat belt buckled sensors, functioning in a similar manner.

In one embodiment of the present invention, the apparatus may include a law enforcement notification device. The law enforcement notification device may send out a signal notifying law enforcement that the first seat belt is not buckled. The law enforcement notification device may send out a signal notifying law enforcement that the first seat belt is not properly securing the individual.

In one embodiment of the present invention a driver's license device is provided. The driver's license device is configured to be incorporated into a driver's license for a driver. The driver's license for a driver may include a computer processor, a computer memory, and a receiver/transmitter. The computer processor of the driver's license device may be programmed to retrieve information concerning the driver from the computer memory and to cause the information to be transmitted by the receiver/transmitter. The apparatus may also include a police patrol vehicle device comprising a receiver, a computer processor, and a display device. The computer processor of the police patrol vehicle device may be configured to receive information transmitted by the driver's license device receiver/transmitter, and to display the information on the display device.

One embodiment of the present invention includes an apparatus for use in a vehicle comprising a scanner, a computer processor, a computer memory, a green light; and a red light. The scanner may be configured to communicate with the computer processor. The scanner, the computer processor, and the computer memory may be configured to scan in information from a driver's license into the computer memory using the computer processor, and the computer processor may be programmed to cause the green light to light up and the red light to not light up after the information from the driver's license has been scanned into the computer memory. The computer processor may be programmed to light up the red light and not light up the green light when the information from the driver's license has not been scanned into the computer memory.

The computer processor may be programmed to compare the information from the driver's license with information for a plurality of driver's licenses stored in the computer memory to determine whether the driver's license is suspended. The computer processor may cause a signal to be generated which disables the vehicle engine if the driver's license is determined to be suspended.

In one embodiment of the present invention a housing is provided, wherein the scanner, the computer processor, the computer memory, the red light and the green light are connected to the housing. The housing may have an adhesive which allows the housing to be adhered inside of a vehicle. A vehicle identification code may be placed on the housing. The apparatus may further include a receiver/transmitter, wherein the computer processor is programmed to cause the receiver/transmitter to transmit the information out from the receiver/transmitter.

The receiver/transmitter may be configured to receive a driver license activation signal from a motor vehicle monitoring center. The computer processor may be programmed to light up the green light in response to the driver license activation signal. The apparatus may further include a receiver/transmitter, wherein the receiver/transmitter is configured to receive a driver license activation signal from a motor vehicle monitoring center. The computer processor may be programmed to light up the red light in response to the driver license deactivation signal.

In another embodiment of the present invention an apparatus is provided comprising a facial imaging device, a computer processor, and a computer memory. The facial imaging device may take a first image of a person's face. The computer processor may be programmed to cause the first image to be compared with a second image stored in the computer memory. The computer processor may be programmed to disable operation of a vehicle if the first image does not substantially match the second image stored in the computer memory. The apparatus may also include a receiver/transmitter. The computer processor may cause the first image to be transmitted by the receiver/transmitter to a monitoring center at a remote location. The computer memory may be located at the remote location. The first image may be compared to the second image at the remote location. The monitoring center may send a signal back to the receiver/transmitter to indicate whether the first image substantially matches the second image. The computer processor may be programmed to disable operation of the vehicle in response to the signal, if the signal indicates that the first image does not substantially match the second image.

DETAILED DESCRIPTION OF THE DRAWINGS

Figure 1:
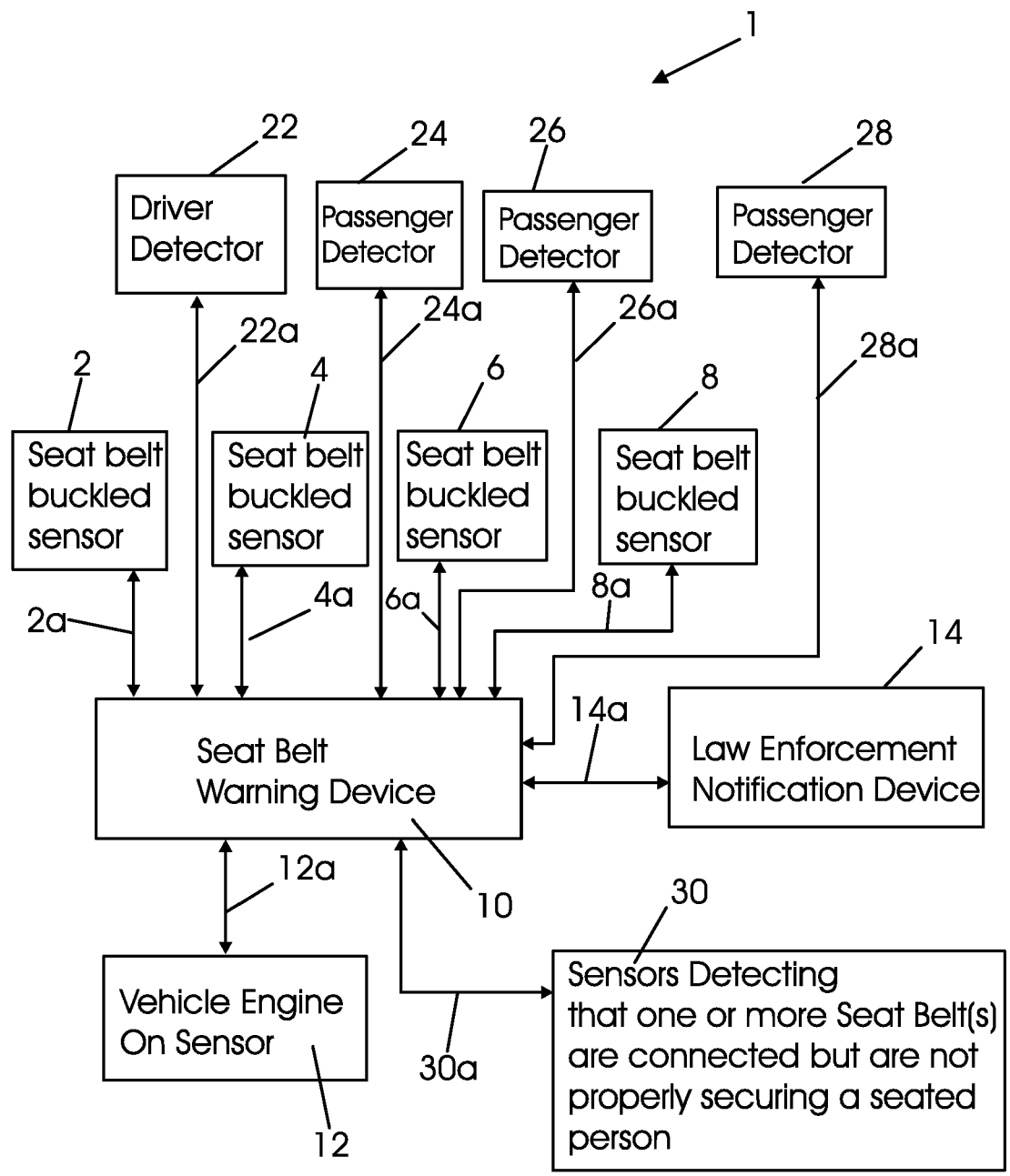
FIG. 1 shows a diagram of an apparatus in accordance with an embodiment of the present invention.

FIG. 1 shows a diagram of an apparatus 1 in accordance with an embodiment of the present invention. The apparatus 1 The apparatus 1 includes a seat belt buckled sensors 2, 4, 6, and 8, a seat belt warning device 10, a vehicle engine on sensor 12, and a law enforcement notification device 14. The seat belt buckled sensors 2, 4, 6, and 8, the vehicle engine on sensor 12, and the law enforcement notification device 14 may be electrically connected to or may communicate with seat belt warning device 10 via communication links 2a, 4a, 6a, 8a, 12a, and 14a, respectively.

The apparatus 1 may also include driver detector 22, passenger detector 24, passenger detector 26, and passenger detector 28, which may be electrically connected to or may communicate with seat belt warning device 10 via communication links 22a, 24a, 26a, and 28a, respectively.

The seat belt buckled sensor 2, may be situated on, in, or near the driver's seat in an automobile or other vehicle, so that the sensor 2 can detect whether a driver's seat belt has been buckled. Similarly, the seat belt buckled sensors 4, 6, and 8 may be situated on, in, or near the passenger's seat, rear left seat, and rear right seat, respectively, in an automobile or other vehicle, so that the sensors 4, 6, and 8 can detect these respective seat belts have been buckled.

The driver detector 22, may be situated on, in, or near the driver's seat in an automobile or other vehicle, so that the driver detector 22 can detect whether a person is in the driver's seat. Similarly, the passenger detectors 24, 26, and 28 may be situated on, in, or near the passenger's seat, rear left seat, and rear right seat, respectively, in an automobile or other vehicle, so that the passenger detectors 24, 26, and 28 can detect whether someone is seated in those seats.

In accordance with one embodiment of the present invention, the seat belt warning device 10 may include a processor, such as a computer processor. The seat belt warning device 10 may receive a signal from any of the sensors 2, 4, 6, and 8, indicating whether the appropriate seat belt is buckled and a signal from any of the detectors 22, 24, 26, and 28 indicating whether someone is seated in that particular seat. If a particular seat belt is unbuckled and if someone is seated in that seat, and if at the same time the vehicle engine is on as indicated by a signal from vehicle on sensor 12, then seat belt warning device 10 is programmed to activate an alarm and to send a signal to law enforcement notification device 14. The alarm may be part of the seat belt warning device 10. The law enforcement notification device 14 may send out a wireless signal such as a cellular telephone call to a police station or other wireless signal.

Each of the driver detector 22, the passenger detector 24, the passenger detector 26, and the passenger detector 28 may be in the form of a car seat mat sensor. Each car mat sensor (for each of 22, 24, 26, and 28) may be installed underneath a seat cover at the time of manufacture of a vehicle, such as an automobile. For example, the driver detector 22 may be comprised of a car mat sensor or a car mat having a plurality of sensors, and may be installed under a seat cover, under a seat backing and under a seat floor, for the driver's seat of a vehicle, such as an automobile. I.e. the driver detector 22 may have a portion located on the floor, where the driver's feet touch, a portion located on the seat, where the driver's rear end sits, and a portion located on the backing, where the driver's back presses against.

A driver of the vehicle, sitting in the driver's seat, would step on, sit on, and lean against the floor portion, rear end portion, and backing portion, respectively, of the driver detector 22 comprised of a car mat sensor or a car mat having a plurality of sensors. In this manner the driver's presence would be detected and a warning to put on a seat belt could be given.

Figure 7A:
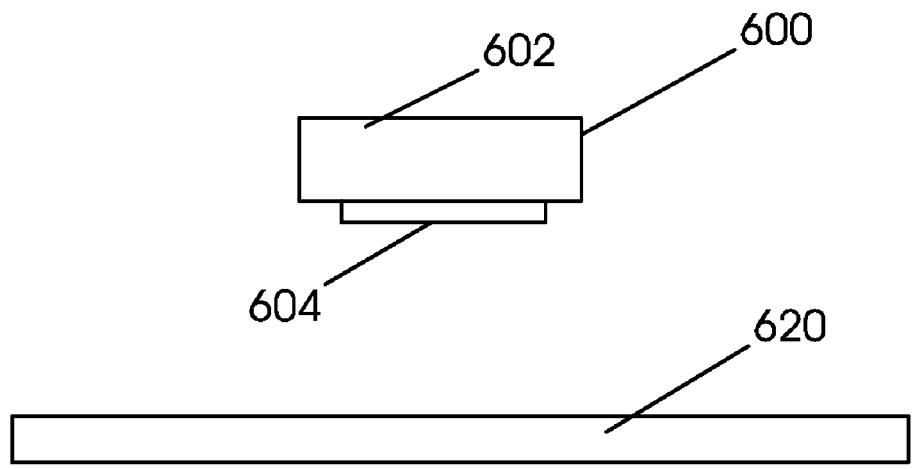
FIG. 7A shows a simplified diagram of a seat belt buckle and sensor and a seat sensor in a first state.
Figure 7B:
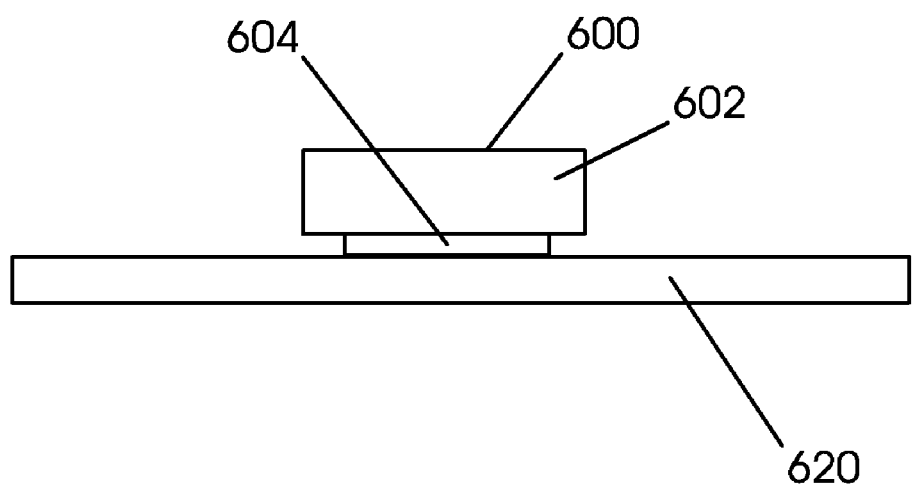
FIG. 7B shows a simplified diagram of the seat belt buckle and sensor and a seat sensor in a second state.

The apparatus 1 may further include one or more sensors 30 detecting that one or more seat belts are connected but are not properly securing a seated person. For example the one or more sensors 30 may include a sensor 604, such as shown in FIG. 7A. The sensor 604 may be attached to a seat belt buckle 602. The sensor 604 and seat belt buckle 602 may form an apparatus 600. FIG. 7A also shows a simplified form of a sensor device 620 which may be wrapped around each car seat. In FIG. 7A, the seat belt buckle sensor 604 and the car seat sensor 620 are not in contact, and in this configuration a signal would be provided to the seat belt warning device 10 that the seat belt buckle 602 is not in contact with the corresponding seat. In FIG. 7B, the seat belt buckle sensor 604 and the car seat sensor 620 are in contact, and in this configuration a signal would be provided to the seat belt warning device 10 that the seat belt buckle 602 is in contact with the corresponding seat.

In operation, referring to FIGS. 1, 7A and 7B, if a person is, for example, sitting in the driver's seat, a signal indicating this will be provided by the driver detector 22 in FIG. 1 to the seat belt warning device 10. If a person seated in the driver's seat has buckled their seat belt, a signal indicating this will be provided by the seat belt buckled sensor 2. If a person seated in the driver's seat is sitting on their seat belt, i.e. the seat belt is not properly secured around their body, then a sensor of the sensors 30, which may be for example sensor 604 of FIGS. 7A and 7B, may provide a signal indicating this to the seat belt warning device 10. The sensor 604 may include a transmitter for transmitting a signal or signals indicating that the seat belt buckle sensor 604 is in contact or is not in contact with the car seat sensor 620. A sensor, similar to sensor 604, may be provided for each car seat buckle corresponding to each car seat. The sensor 604 may include a coating which is located on a car seat buckle. The car seat sensor 620 may be in the form of a wrap.

If, for example, a person is seated in the driver's seat, has buckled their seat belt buckle but is sitting on their seat belt, the seat belt warning device 10 may emit a beeping sound followed by an audio message, stating a warning, such as "please secure your car seat belt properly, or I will notify a nearby police officer." However, if a car seat, such the driver's seat, is occupied, the driver's car seat belt buckle is buckled and properly secures the driver (i.e. the driver is not sitting on his seat belt) the warning device 10 does not emit a warning. The seat belt warning device 10 of the apparatus 1, which may be located inside a vehicle, may beep to alert the car seat occupant, such as an occupant of a driver's seat, that his/her car seat belt is not buckled properly. The car seat occupant should pull or drag the car seat belt all the way to his/her side to the shoulder then to the buckle holder.

The seat belt warning device 10 may include an audible warning device including a speaker which may be located inside of the vehicle. The seat belt warning device 10 may provide an audible message to the inside of the vehicle when the vehicle engine is on, when a driver/passenger is detected by one of detectors 22, 24, 26, and 28 and the corresponding seat belt buckled sensor 2, 4, 6, and 8 does not indicate that the corresponding seat belt is buckled. For example of a driver is detected by detector 22, but the driver's seat belt is not buckled as indicated by sensor 2, then the seat belt warning device 10 will provide an audible message assuming the vehicle is on as indicated by vehicle engine on sensor 12. The audible message may say "driver put on your seat belt". Similarly, if the rear left passenger, does not have their seat belt on when the engine is on, the seat belt warning device 10 may provide an audible message such as "rear left passenger put on your seat belt". Analagous messages may be provided for the other passengers identifying the specific passenger.

Each of the detectors 22, 24, 26, and 28 may have a floor portion, a rear end portion, and a backing portion. Each portion may be comprised of a plurality of sensors. If an individual is detected by any of the floor, rear end, or backing portions, the seat belt warning device 10 may provide an audible message to buckle one's seat belts. A driver or passenger, needs only to be detected by one of the floor, rear end, and backing portions of the corresponding detector of 22, 24, 26, and 28, in order to be detected by that detector. In that way a child, or smaller adult, will still be detected even if they don't trigger the floor portion.

Figure 2:
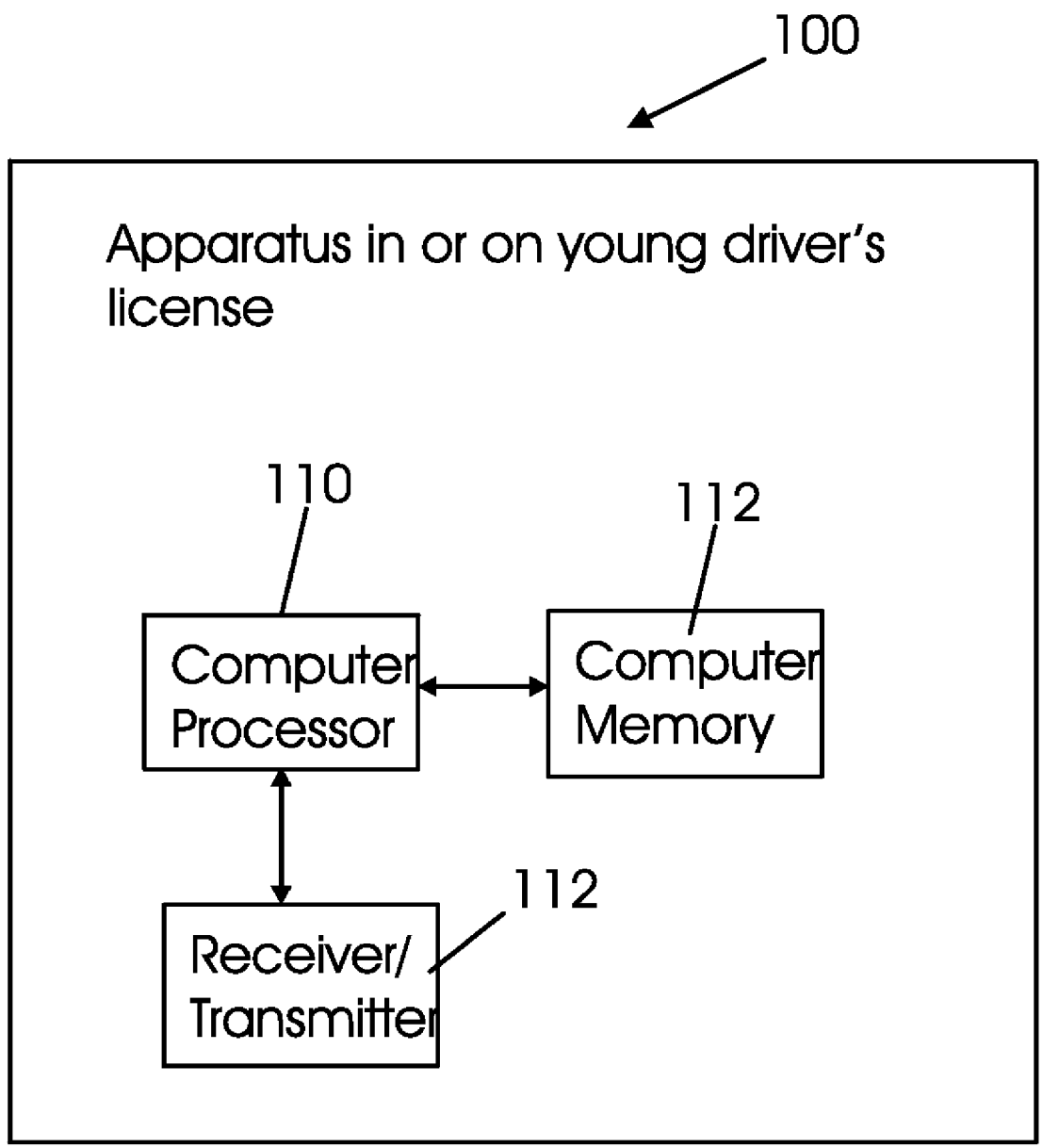
FIG. 2 shows a diagram of an apparatus for use with a physical driver's license in accordance with another embodiment of the present invention.

FIG. 2 shows a diagram of an apparatus 100 in accordance with another embodiment of the present invention. The apparatus 100 may be a physical driver's license or may be part of a physical driver's license of an individual who is twenty-one years of age or younger. The apparatus 100 may include a computer processor 110, a computer memory 112, and a receiver/transmitter 114. The computer memory may have stored therein information concerning the individual, such as age, date of birth, and driver's license number. The information may be retrieved by the computer processor 110 from the memory 112 and transmitted out as a wireless signal into the airwaves via receiver/transmitter 114.

Figure 3:
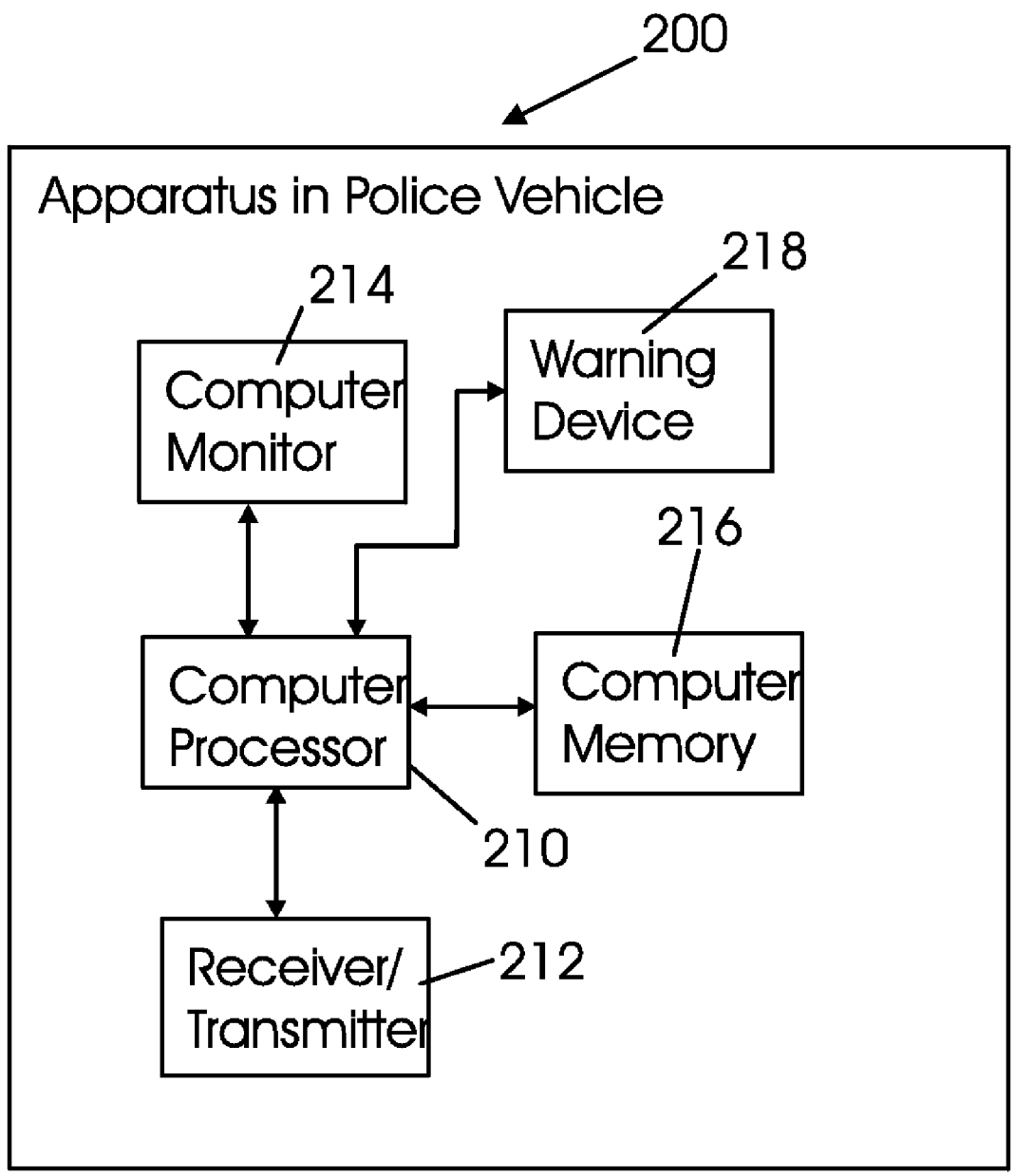
FIG. 3 shows a diagram of an apparatus which can be located in a police patrol vehicle.

The wireless signal with the information may be received by a receiver, such as receiver/transmitter 212, shown in FIG. 3, on, or in a police patrol vehicle, which is within a certain range of the apparatus 100. The receiver/transmitter 212 may be part of an apparatus 200, shown in FIG. 3, which includes a computer monitor 214, a computer processor 210, receiver/transmitter 212, and computer memory 216, and a warning device 218. The apparatus 200 may be located on or in a police patrol car or vehicle. The receiver/transmitter 212 may provide the information concerning a young driver to the computer processor 210 which may cause the information to be displayed on the computer monitor 214. The apparatus 200 may be part of a police scanner.

The warning device 218 in the police vehicle, will be activated by the computer processor 210 when signal is received by the receiver/transmitter 212 to indicate the presence of a young driver. The warning device 218 may produce an audible alarm, such as two alarm beeps followed by an audio sound that says something like "young driver in the vicinity".

Figure 4:
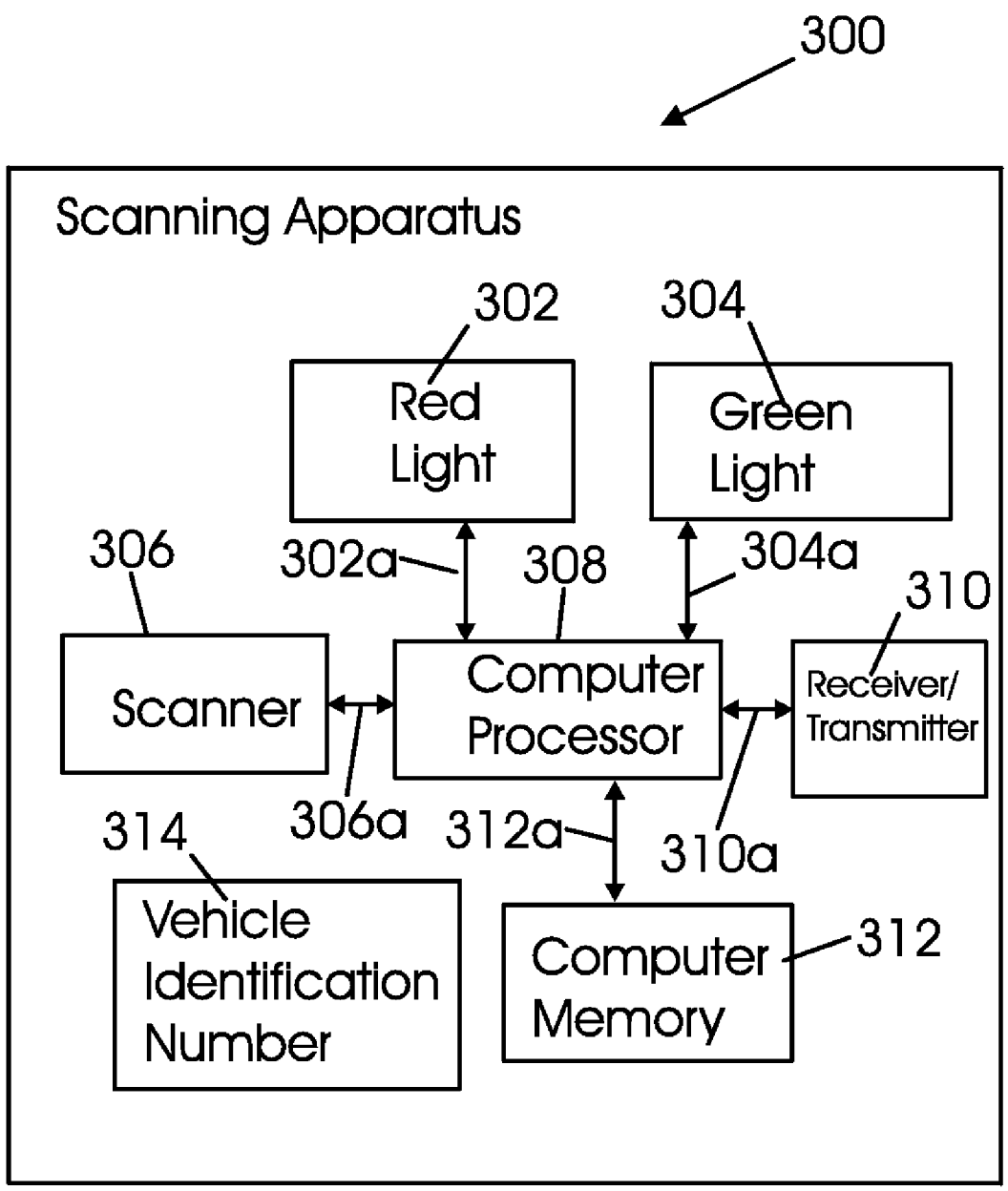
FIG. 4 shows a diagram of an apparatus which can be located on a vehicle of a young driver in accordance with another embodiment of the present invention.

FIG. 4 shows a diagram of a scanning apparatus 300 which can be located on a vehicle of a young driver in accordance with another embodiment of the present invention. The apparatus 300 includes a red light 302, a green light 304, a scanner 306, a computer processor 308, a computer memory 312, and a receiver/transmitter 310. The red light 302, the green light 304, the scanner 306, the receiver/transmitter 310, and the computer memory 312 may be electrically connected or may be in communications with the computer processor 308 via communications links 302a, 304a, 306a, 310a, and 312a, respectively.

A young driver, such as one twenty-one years old and younger, can scan in their driver's license information, including birth date, age, and driver's license number, into the scanner 306, and thereby into the computer processor 308 and the computer memory 310. After the information has been scanned into the computer memory 310, the green light 304 lights up while the red light is not lit up. If the driver's license information has not been scanned in, the red light 302 lights up while the green light 304 does not light up. The apparatus 300 may be stuck to the windshield of the young driver's vehicle so that it can be easily seen by a police officer passing by the young driver's vehicle. If the red light 302 is lit, and the green light 304 is not lit, the police officer can pull over the young driver. If the information has been scanned in, the information can be transmitted out over the airwaves by the receiver/transmitter 312, so that a passing police vehicle can receive it. A vehicle identification code may be shown physically on the apparatus 300.

In one embodiment, when the young driver does not scan in their driver's license information into scanner 306, a signal will be sent out to the apparatus 200 in the police vehicle. The signal will be received by receiver/transmitter 212 and will cause the activation of a red light which may be part of the warning device 218.

The scanning apparatus 300 may be activated from a state's DMV monitoring center 400. In one embodiment, the DMV monitoring center 400 may include a driver license activation device 412 and a driver license deactivation device 414 which may be electrically connected or in communication with the computer processor 406 via communications links 412a and 414a, respectively. The activation device 412 may be a button, and an operator located at or near the DMV monitoring center 400 may press the device 412 in order to activate the green light 304 on the scanning apparatus 300 shown in FIG. 4. The scanning apparatus 300 may be part of a driver license, or a device in driver's vehicle. In one embodiment, as soon as the activation device 412 is activated, such as by pushing a button, a green light signal is sent via the receiver/transmitter 408 to the scanning apparatus 300 shown in FIG. 1. The computer processor 308 of the apparatus 300 receives the green light signal via the receiver/transmitter 310 and the computer processor 308 causes the green light 304 to be on and lit up. When the green light 304 is on and lit up, it indicates that the holder of this particular driver license number, corresponding to scanning apparatus 300, is authorized to operate a vehicle so that when the particular driver license number corresponding to apparatus 300 is scanned into the scanner 306 of a preexisting vehicle, a pre-recorded message will be emitted by the computer processor 308 (which may include a speaker or other sound emission device), that the holder of a driver license corresponding to the scanning apparatus 300, is authorized to operate a vehicle and the green light 304 on the scanning apparatus 300 will light up or beep.

Figure 5:
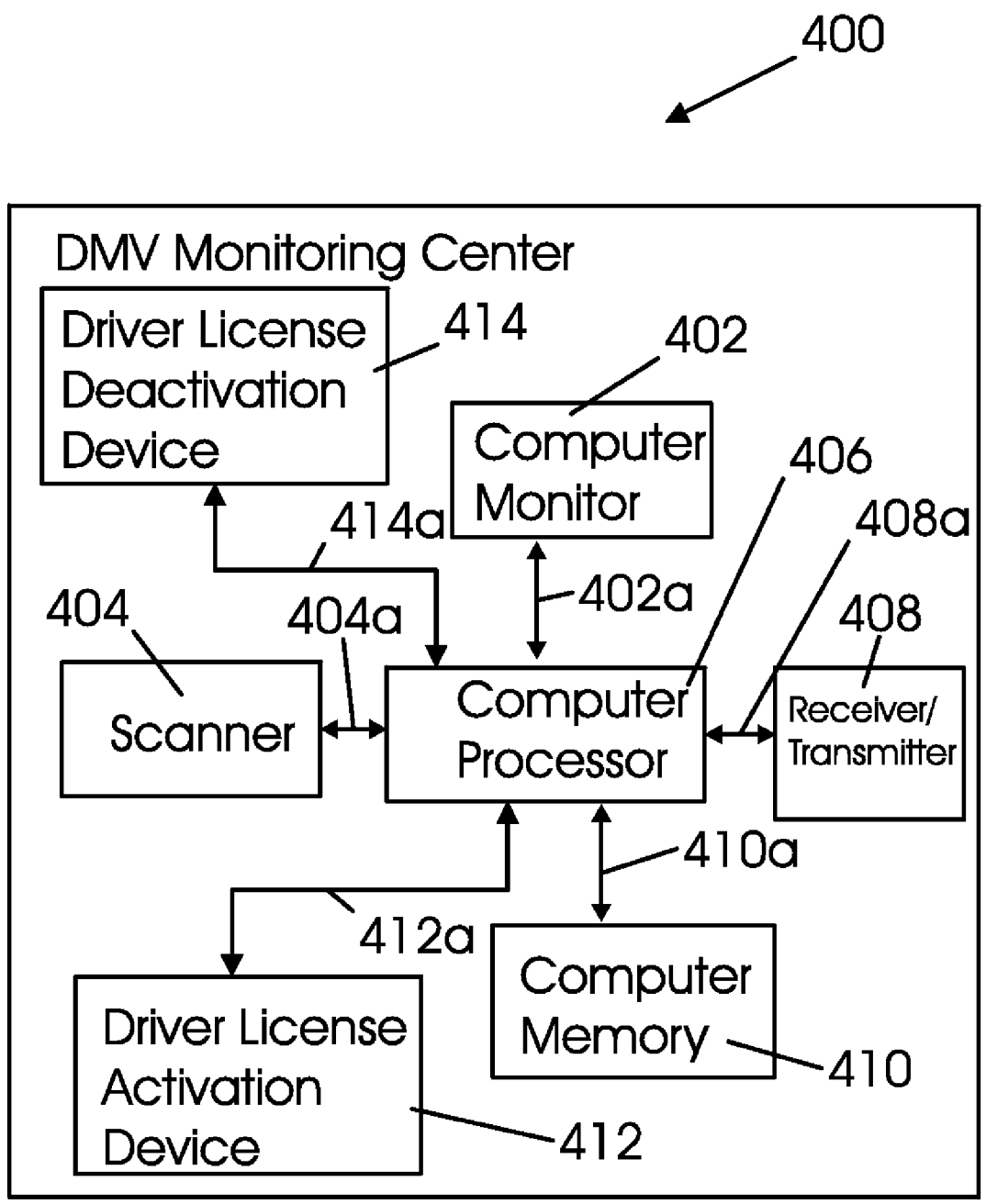
FIG. 5 shows a diagram of an apparatus for a division of motor vehicles monitoring center.

If the user presses or otherwise activates the driver license deactivation device 414, such as by pushing a button, this will cause an activate red light signal to be sent by the receiver/transmitter 408 shown in FIG. 5. The activate red light signal will be received by receiver transmitter 310 of the scanning apparatus 300 and the computer processor 308 will cause the red light 302 to be activated or lit up. An active or on red light 302 indicates that a the particular driver license number is not authorized to operate the particular vehicle and whenever the holder of this particular driver's license number scans this driver license into the scanner 306 of the scanning apparatus 300 of a pre-existing vehicle, a pre-recorded message may be emitted by computer processor 308, which specify for example, "your driver license is suspended" and/or "please call or visit the state's DMV as soon as possible".

In one embodiment the apparatus 100 (which can be called the driver license number apparatus 100) can be deactivated from the state's DMV monitoring center 400 by pushing a button, which may be part of the DMV monitoring center 400, and which may be labeled "de-activate driver license mode button". (see above response for the answer to these question/s In another embodiment of the present invention, if the young driver's license is suspended, when he/she scans his/her driver's license into the scanner 306, the computer processor 308 causes the driver's license information to be transmitted out by receiver/transmitter 312, and to thereby be compared with a database of suspended driver's license available at the division of motor vehicle. If a signal comes back to receiver/transmitter 312 indicating that the license is suspended then the computer processor 308 may cause an audible message to be provided, or may send a wireless signal to receiver/transmitter 312 to provide such as message through seat belt warning device 10. The audible message may state "Your driver license has been suspended. Please call or visit your state's division of motor vehicle as soon as possible." In the pre-existing vehicle, If the driver drives his/her vehicle with a suspended license the computer processor 308 will recognize this when the driver attempts to scan the suspended license into the scanner 306. In one embodiment, the fact that the driver's license number is suspended may be stored in computer memory 312 or may be transmitted from the DMV monitoring center 400 to the scanning apparatus 300 and thereafter stored in the computer memory 312.

The red light 302 of the scanning apparatus 300 may be located at the back of a scanner, such as the scanner 306. The red light 302 may blink if a driver with a suspended license drives around town with a suspended license. The blinking red light 302 may alert a nearby police office that there is a driver driving around while his/her driver license is under suspension. On the other hand, in a pre-existing vehicle, if a driver fails to scan his/her driver license into the scanner 306 as required by law, only one red light, such as red light 302 at the back of the scanner, such as scanner 306 or scanning apparatus 300, may be activated to blink as the driver drives through town to alert a nearby police officer that this very driver did not scan his/her driver license into the scanner 306 as required by the law.

The seat belt warning device 10 shown in FIG. 1, may be programmed to respond to an ignition signal or vehicle engine on signal from the vehicle engine on sensor 12 to cause an audible message to be provided inside the young driver's vehicle. This message may say "please scan your driver license up into the scanning device on your vehicle's dashboard". The young driver may then use scanner 306 to scan in the driver's license information into the computer processor 308 and into the computer memory 310.

The scanner 306, shown in FIG. 4, may be located on a window or dash board of a vehicle, such as an automobile, typically for automobiles on the road today. For future vehicles or automobiles, the scanner 306 may be built in to a steering wheel of the vehicle. The computer processor 308 may cause the red light 302 shown in FIG. 4, to light up or blink on and off if a prospective driver scans in a driver's license into scanner 306 which is suspended. The computer processor 308 may compare the driver's license scanned in scanner 306, with a list of driver's licenses in computer memory 312 or which a list of driver's licenses obtained from receiver/transmitter 310. The computer processor 308 may send a signal via the receiver/transmitter 310 to cause the shut down engine and disable ignition switch 512 of FIG. 6 to be activated, causing a vehicle to shut down and to prevent the vehicle from starting.

If a driver's license was scanned into scanner 306 and the computer processor 308 determines that the driver's license is not suspended, then green light 304 will be turned on or made to blink on and off and the shut down engine and disable ignition switch 512 will not be activated and the engine will not shut down.

The scanner 306, shown in FIG. 4, may also be used as a teenage driver alert device. The scanner 306 may have the vehicle identification number (VIN number) printed on a housing of the scanner 306, in that way the scanner 306 would be assigned to that particular vehicle, and should not be transferred to another vehicle with a different VIN number. If the scanner 306 (in a pre-existing vehicle embodiment) is transferred it can be a motor vehicle violation.

The apparatus 300 may be connected to the vehicle engine on sensor 12 in FIG. 1 or may be able to receive a signal via receiver/transmitter 310 from the vehicle engine on sensor 12 in FIG. 1. In one embodiment, each time the vehicle is turned on, information concerning the driver must be transmitted retrieved from the computer memory 312 by the computer processor 308. The information may include date of birth, driver's license number, and a picture of a driver, such as a driver twenty-one years of age or less. This information may be transmitted by the receiver transmitter 310 to the DMV monitoring center 400 shown in FIG. 5.

The DMV monitoring center 400 may include a computer monitor 402, a scanner 404, a computer processor 406, a receiver/transmitter 408, and a computer memory 410. The computer monitor 402, the scanner 404, the receiver/transmitter 408, and the computer memory 410 may be electrically connected to the computer processor 406 via communications links 402a, 404a, 408a, and 410a, respectively.

The DMV monitoring center 400 may receive the information concerning the driver and may display the information on the computer monitor 402. The information displayed may be highlighted. If the vehicle engine is not on, as indicated by vehicle engine on sensor 12, then no information will be sent to the center 400 and no information will be displayed on the monitor 402. In this way, the DMV monitoring center 400 can monitor vehicles which are operational on the roads.

The computer processor 406 of the DMV monitoring center 400 may be programmed to recognize a driver license number, date of birth, and the pictures in both the regular and master driver's licenses. In accordance with an embodiment of the present invention, when a master driver's license is scanned into the scanner 306. The scanner 306 may transmit the master driver's license information via receiver/transmitter 310 shown in FIG. 4 to receiver/transmitter 408 of the DMV monitoring center 400. The master driver's license may be scanned in lieu of an actual vehicle owner's driver license.

Figure 6:
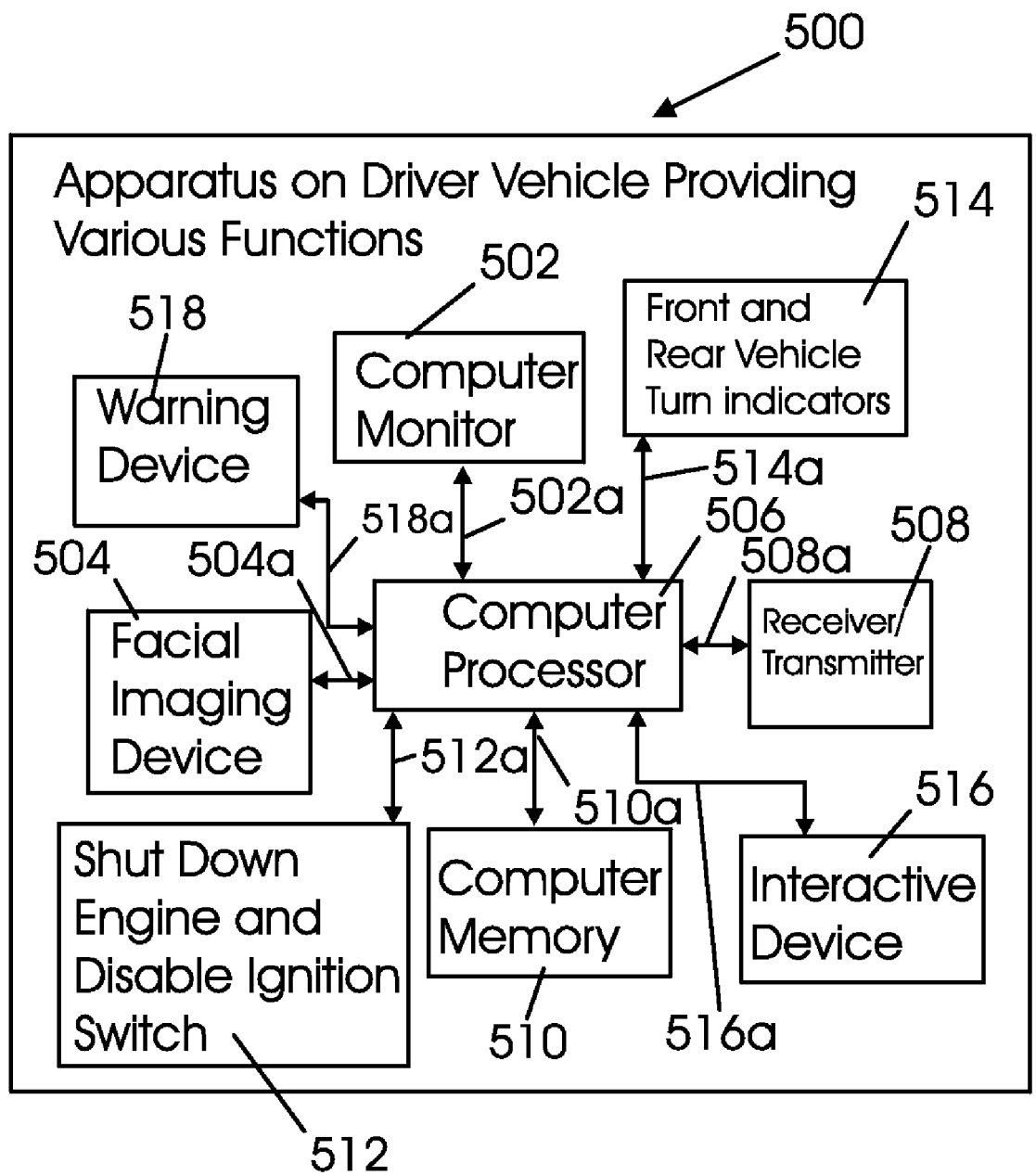
FIG. 6 shows a diagram of an apparatus for a driver vehicle for providing various functions.

FIG. 6 shows a diagram of an apparatus 500 which provides various functions for a driver vehicle. The apparatus 500 may include a computer monitor 502, a facial imaging device 504, a receiver/transmitter 508, a computer memory 510, and a shut down engine and disable ignition switch 512, front and rear vehicle turn indicators 514, interactive device 516, and warning device 518, which communicate with computer processor 506 via communications links 502a, 504a, 508a, 510a, 512a, 514a, 516a, and 518a, respectively. In one embodiment of the present invention all or part of the apparatus 500 may be enclosed on or in a steering wheel of the vehicle.

In at least one embodiment, the facial imaging device 504 is programmed to capture an image of a person who is sitting behind the steering wheel (i.e. in the driver's seat) of the vehicle. The image of the driver is provided to the computer processor 506 and then sent out via the receiver/transmitter 508, along with date of birth, age, and driver's license number information, which may be stored in computer memory 510 or may be retrieved via receiver transmitter 508 from another device, to the DMV monitoring center 400. The DMV monitoring center 400 compares the captured image versus a stored image for the driver having that age and that driver's license number. If the facial image captured does not match the image stored in computer memory 410 for this particular driver, then a red light on the facial imaging device 504 or on the computer monitor 502, or a separate red light not shown, may become lit or may blink to indicate that the vehicle has been stolen. In addition, the computer processor 506 may send a signal to the shut down engine and disable ignition switch 512, which will prevent the vehicle from being started and/or prevent the engine from running. The computer processor 506 may also cause a 911-V (vehicle) call to be made to the police by sending out a signal via the receiver/transmitter 508, and may cause information concerning the vehicle to be sent to the DMV monitoring center 400. The computer processor 506 may also sent a signal to front and rear vehicle turn visual indicators 514 (which may be conventional blinker or vehicle turn indicators or lights) to cause the indicators 514 to flash on and off.

The vehicle can only be operated if the image captured by the facial imaging device 504 is matched with an appropriate facial image stored at the DMV monitoring center 400 for the particular driver's date of birth and driver license number.

A driver's information and/or a vehicle's information concerning automobile insurance can be entered into the computer memory 510 via interactive device 516 which may be a keyboard, computer mouse or any other interactive device. The automobile insurance information may include information regarding auto insurance premium due dates and/or auto-insurance renewal dates. The computer processor 506 may include a timer, which may cause the warning device 518 to provide an audible message when an auto insurance premium or auto insurance renewal is due, or within a time period of this, such as one month before a due date. The warning device may provide an audio signal in different Languages such as English, Spanish, or French.

Similarly the computer processor 506 may provide, for example, one month's advance notice that a driver's license renewal is due, vehicle registration is due, and/or that a vehicle inspection sticker is due for renewal. The deadlines may be entered into and/or stored in computer memory 510. Audible messages may be provided by warning device 518 in response to a signal from the engine on sensor 12 of FIG. 1, which indicates that the engine is on, or an ignition signal, which may communicate with computer processor 506 directly or via receiver/transmitter 508. A reminder/alarm may be sounded each time the vehicle operator starts the engine of the vehicle until the said driving document is renewed and until that is entered into the computer memory 510.

The warning device 518 may include a "town crier" or may provide an indication of when the vehicle owner/operator has violated a motor vehicle related law. For example, the DMV monitoring center 400 may send a signal via receiver/transmitter 408 to the apparatus 500 that the vehicle has been cited for failure to buckle a seat belt. This message would be received by receiver/transmitter 508 and the warning device 518 may be activated or the computer monitor 502 may display a message indicating the violation. Other violations which may be indicated may include illegal use of hand held cell phone, and fake inspection sticker. The warning device 518 may have a blinking red light to indicate that an indication of a violation has been received. This light may blink red until a ticket is paid or resolved with the police department.

In one embodiment an apparatus in a police vehicle, such as apparatus 200 may detect the violation and a warning device 218 may warn a policeman in the police vehicle to mail out a citation. Alternatively, information concerning the violation may be sent from the receiver/transmitter 212 to the DMV monitoring center 400.

In one embodiment a master driver's license is provided for when the vehicle goes for a situation such as when a vehicle goes in for auto repairs. In accordance with an embodiment of the present invention, an auto shop owner may be issued with what can be called a "master driver license" by the state's Division of Motor Vehicles (DMV). The master driver's license may supersede a regular driver's license and the master's driver license can be used to activate the green light 304 shown in FIG. 4, in any vehicle that has a scanner 306, whether a pre-existing or future vehicle as long as the master driver's license holder has the key to a particular vehicle and with this master driver's license the auto shop can scan the master driver's license into the scanner 306 shown in FIG. 4 and it will be reported to the state's DMV that this vehicle has been brought to an authorized auto shop for auto repairs.

In accordance with at least one embodiment of the present invention, there may be at least two types of master driver's license: (a) a government type issued to state agencies to be used by employees of the state and federal officials including the police, and (b) a business type issued to auto shops and other businesses.

The (a) government type of master driver's license may have a code, such as a nine character code. The nine character code may be a combination of alphanumeric characters. The (a) government type of master driver's license may have the particular state's governor's picture, that governor's date of birth and picture.

The (b) business type of master driver's license may be issued to businesses, such as auto shops, auto driving school owners, auto dealerships, financial companies, the repossession companies that may want to reposes the vehicle for lack of payment on the vehicle.

In at least one embodiment of the present invention, in future vehicles, the following is a method which would need to be executed before an automobile could be started. The vehicle driver would need to put a vehicle key in a vehicle ignition switch, such as in 512 of FIG. 6 or a portion of 512. The driver would then turn the ignition key in a first direction such as clockwise. The computer processor 506 of FIG. 6 would be responsive to the turning of the ignition key and may cause a pre-recorded message to be produced by warning device 518. The pre-recorded message may say "please scan your driver's license onto the blinking blue light area on the steering wheel". The individual with the driver's license may then use scanner 306 shown in FIG. 4 to scan in a driver's license into the computer processor 308. Once the driver scans his/her driver license as requested, if the driver's license is valid the green light 304 in the vehicle will light up or be activated and the vehicle will start.

However, if the driver's license is not valid or the driver's license is under suspension, the red light 302 will be lit up by the computer processor 308 and typically will be followed by an audio announcement such as "your driver's license has been suspended, please visit your state's DMV as soon as possible, and the shut down engine and disable ignition switch 512 may be activated to prevent the vehicle from starting.

If a driver fails to scan his/her driver's license into the scanner 306 and drives away his/her vehicle, the processor 308 will cause the red light 302 to blink or otherwise be activated, so that it is visible outside the vehicle, to alert any nearby police office.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising
a scanner;
a computer processor;
a computer memory;
a visual indicator;
wherein the scanner is configured to communicate with the computer processor; and
wherein the scanner, the computer processor, and the computer memory are configured to scan in valid driver identification information into the computer memory using the computer processor;
wherein the computer processor is programmed to cause the visual indicator to be activated if valid driver identification information is not scanned into the computer memory using the computer processor and a vehicle is driven;
wherein the computer processor is programmed to not cause the visual indicator to be activated if valid driver identification information is scanned into the computer memory using the computer processor and the vehicle is driven.

2. The apparatus of claim 1 further comprising
the vehicle;
and wherein the visual indicator is fixed to the vehicle so that the visual indicator when activated can be seen outside of the vehicle.

3. The apparatus of claim 1 wherein
valid driver identification information includes a valid non-suspended driver's license number.

4. The apparatus of claim 1
wherein the visual indicator includes a light.

5. The apparatus of claim 4 wherein
red light is emitted from the light when the visual indicator is activated.

6. The apparatus of claim 1 further comprising
an audible indication device; and
wherein the computer processor is programmed to cause the audible indication device to emit a first audible alarm if valid driver identification information is not scanned into the computer memory using the computer processor and an engine of the vehicle engine is started;
wherein computer processor is programmed to not cause the audible indication device to emit the first audible alarm if valid driver identification information is scanned into the computer memory using the computer processor and the engine of the vehicle engine.

7. The apparatus of claim 6 wherein
valid driver identification information includes a valid non-suspended driver's license number.

8. The apparatus of claim 1 wherein
valid driver identification information includes a master driver license for an auto shop owner.

9. The apparatus of claim 6 wherein
valid driver identification information includes a master driver license for an auto shop owner.

10. The apparatus of claim 1 further comprising
a first seat occupant detector;
a first seat belt buckled sensor;
a seat belt warning device;
wherein the seat belt warning device is configured to communicate with the first seat occupant detector and the first seat belt buckled sensor; and
wherein the seat belt warning device is programmed to cause an audible warning when the first seat occupant detector detects the presence of an individual in a first seat of the vehicle and the first seat belt buckled sensor detects that a first seat belt corresponding to the first seat is not buckled.

11. The apparatus of claim 1 further comprising
a transmitter configured to transmit the scanned in valid driver identification information in a wireless signal from the vehicle into the airwaves;
a receiver configured to receive the wireless signal at a police vehicle; and
a warning device configured to produce an audio message indicating that a driver twenty-one years old or younger is in the vicinity of the police vehicle if the scanned in valid driver identification information in the wireless signal refers to a driver twenty-one years old or younger.

12. An apparatus for use in a vehicle comprised of
a scanner;
a computer processor;
a computer memory;
an audible indication device;
wherein the scanner is configured to communicate with the computer processor; and
wherein the scanner, the computer processor, and the computer memory are configured to scan in valid driver identification information into the computer memory using the computer processor, and
wherein the computer processor is programmed to cause the audible indication device to emit a first audible alarm if valid driver identification information is not scanned into the computer memory using the computer processor and a vehicle engine is started;
wherein computer processor is programmed to not cause the audible indication device to emit the first audible alarm if valid driver identification information is scanned into the computer memory using the computer processor and the vehicle engine is started.

13. The apparatus of claim 12 wherein
valid driver identification information includes a valid non-suspended driver's license number.

14. The apparatus of claim 12 wherein
valid driver identification information includes a master driver license for an auto shop owner.

* * * * *